United States Patent
Ye et al.

(10) Patent No.: US 8,483,285 B2
(45) Date of Patent: Jul. 9, 2013

(54) VIDEO CODING USING TRANSFORMS BIGGER THAN 4×4 AND 8×8

(75) Inventors: Yan Ye, San Diego, CA (US); Peisong Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 12/508,434

(22) Filed: Jul. 23, 2009

(65) Prior Publication Data

US 2010/0086049 A1    Apr. 8, 2010

Related U.S. Application Data

(60) Provisional application No. 61/179,228, filed on May 18, 2009, provisional application No. 61/102,783, filed on Oct. 3, 2008.

(51) Int. Cl.
*H04N 11/02* (2006.01)

(52) U.S. Cl.
USPC ............. 375/240.24; 375/240.16; 375/240.18

(58) Field of Classification Search
None
See application file for complete search history.

(56) References Cited

U.S. PATENT DOCUMENTS

| | | | |
|---|---|---|---|
| 7,529,302 B2 | 5/2009 | Mukerjee et al. | |
| 2004/0062309 A1 | 4/2004 | Romanowski et al. | |
| 2005/0025246 A1 | 2/2005 | Holcomb | |
| 2005/0053292 A1 | 3/2005 | Mukerjee et al. | |
| 2005/0249291 A1 * | 11/2005 | Gordon et al. | 375/240.18 |
| 2006/0153297 A1 | 7/2006 | Boyce | |
| 2007/0206679 A1 | 9/2007 | Lim et al. | |
| 2008/0025391 A1 | 1/2008 | Amon et al. | |
| 2008/0192824 A1 | 8/2008 | Lim et al. | |
| 2008/0310504 A1 | 12/2008 | Ye et al. | |
| 2008/0310507 A1 | 12/2008 | Ye et al. | |
| 2008/0310512 A1 | 12/2008 | Ye et al. | |
| 2010/0086029 A1 | 4/2010 | Chen et al. | |

(Continued)

FOREIGN PATENT DOCUMENTS

| | | |
|---|---|---|
| CN | 1810037 A | 7/2006 |
| CN | 101019435 A | 8/2007 |

(Continued)

OTHER PUBLICATIONS

JVT:"Text of Joint FCD for Joint Video Specification" Joint Video Team (JVT) of ISO/IEC MPEG & ITU-T VCEG(ISO/IEC JTC1/SC29/WG11 and ITU-T SG16 Q6), no JVT-D157, Aug. 10, 2002.*

(Continued)

*Primary Examiner* — Mehrdad Dastouri
*Assistant Examiner* — James Anderson, II
(74) *Attorney, Agent, or Firm* — John G. Rickenbrode

(57) ABSTRACT

In a video processing system, a method and system for applying transforms larger than 8×8 and non-rectangular transforms, and generating transform size syntax elements indicative of the transforms for video decoding are provided. The transform size syntax element may be generated by an encoder based on a prediction block size of a video block and the contents of the video block. Further, the transform size syntax element may be generated according to a set of rules to select from 4×4, 8×8, and larger transform sizes during an encoding process. A decoder may perform an inverse transform based on the transform size syntax element and the rules used by the encoder. The transform size syntax element may be transmitted to the decoder as part of the encoded video bitstream.

74 Claims, 7 Drawing Sheets

U.S. PATENT DOCUMENTS

| | | | |
|---|---|---|---|
| 2010/0086030 A1 | 4/2010 | Chen et al. | |
| 2010/0086031 A1 | 4/2010 | Chen et al. | |
| 2010/0086032 A1 | 4/2010 | Chen et al. | |

FOREIGN PATENT DOCUMENTS

| | | |
|---|---|---|
| EP | 1429564 A1 | 6/2004 |
| JP | 11164305 A | 6/1999 |
| JP | 2003533141 A | 11/2003 |
| JP | 2007243427 A | 9/2007 |
| JP | 2008521303 A | 6/2008 |
| JP | 2008219870 A | 9/2008 |
| JP | 2010502102 A | 1/2010 |
| TW | 200835343 A | 8/2008 |
| TW | 200838317 | 9/2008 |
| WO | 0186961 A1 | 11/2001 |
| WO | 03075579 A2 | 9/2003 |
| WO | 2007034918 A1 | 3/2007 |
| WO | WO2008027192 | 3/2008 |

OTHER PUBLICATIONS

Wien, et al: "Hybrid Video Coding using Variable Block Transforms" Visual Communications and Image Processing; San Jose, Jan. 21, 2002.*

Ye et al (Qualcomm): "Improved Intra Coding". (Video Encoding Experts Group of ITU-T SG.16), Oct. 20, 2007.*

Ma et al., "High-Definition Video Coding with Super-Macroblocks", 2007, Visual Communications and Image Processing.*

Bo-Yuan Chen, et al: "Using H.264 Coded Block Patterns for Fast Inter-Mode Selection," Multimedia and Expo, 2008 IEEE, Jun. 23, 2008, pp. 721-724.

Chen P., et al., "Video Coding Using Extended Block Sizes," 36th Meeting, VCEG, Oct. 8, 2008, San Diego, Video Coding Experts Group, ITU-T, Q.6, SG.16, (Oct. 15, 2008), XP030003645.

Information Technology-Coding of Audio-Visual Objects-Part 10: Advanced Video Coding, ISO/IEC 14496-10:2005.

International Preliminary Report on Patentability—PCT/US2009/058833, The International Bureau of WIPO—Geneva, Switzerland, Jan. 10, 2011.

International Preliminary Report on Patentability—PCT/US2009/058844, The International Bureau of WIPO—Geneva, Switzerland, Jan. 10, 2011.

International Search Report & Written Opinion—PCT/US09/059014, International Search Authority—European Patent Office—Mar. 26, 2010.

International Search Report & Written Opinion—PCT/US09/058833, International Search Authority European Patent Office Apr. 29, 2010.

International Search Report & Written Opinion—PCT/US09/058836, International Search Authority European Patent Office Apr. 26, 2010.

International Search Report & Written Opinion—PCT/US09/058839, International Search Authority European Patent Office Apr. 29, 2010.

International Search Report & Written Opinion—PCT/US2009/058844—International Search Authority—European Patent Office, Apr. 26, 2010.

JVT / Sullivan et al: "Draft ITU-T H.264:2004 Amd. 1 ISO/IEC 14496-10:2004/FDAMI AVC FRext" Joint Video Team (JVT) of ISO/IEC MPEG & ITU-T VCEG(ISO/IEC JTC1/SC29/WG11 and ITU-T SG16 Q.6), No. JVT-L047d12, Jul. 23, 2004, XP030005899 Subclauses 7.4.2.2 and 7.4.5; pp. 30-32.

JVT: "Draft ITU-T Recommendation and Final Draft International Standard of Joint Video Specification (ITU-T Rec. H.264 ISO/IEC 14496-10 AVC)" Joint Video Team of ISO/IEC MPEG & ITU-T VCEG (ISO/IEC JTC1/SC29/W11 and ITU-T SGI6 Q6) No. JVT-G050r1, (Mar. 14, 2003), XP030005712.

JVT: "Text of Joint FCD for Joint Video Specification" Joint Video Team (JVT) of ISO/IEC MPEG & ITU-T VCEG(ISO/IEC JTC1/SC29/WG11 and ITU-T SG16 06), No. JVT-D157, Aug. 10, 2002, XP030005420 sections 8.4-8.6, section 12.

Kim, J., et al., "Enlarging MB Size for High Fidelity Video Coding Beyond HD" 36th VCEG Meeting Oct. 8, 2008 San Diego US, Video Coding Experts Group of ITU-T SG.16 Q.6) (Oct. 5, 2008), XP030003643.

Lim, S. et al., "Intra Coding Using Extended Block Size" 38 VCEG Meeting; Jul. 1, 2009-Jul. 8, 2009 London, Geneva, Video Coding Experts Group of ITU-T SG.16 Q.6) Jul. 7, 2009.

Ma, S. et al., "High-Difinition Video Coding With Super-Macroblocks (Invited Paper)" Visual Communications and Image Processing; Jan. 30, 2007-Feb. 1, 2007 San Jose, Jan. 30, 2007, XP030081117.

Marpe, D et al: "H. 264/ MPEG4-AVC Fidelity Range Extensions: Tools, Profiles, Performance, and Application Areas" Image Processing, 2005. ICIP 2005. IEEE International Conference on Genova, Italy Sep. 11-14, 2005, Piscataway, NJ, USA,IEEE, vol. 1, Sep. 11, 2005, pp. 593-596, XP010850819 ISBN: 978-0-7803-9134-5 section I I.

Mathias Wien and Jens-Rainer Ohm: "Simplified Adaptive Block Transforms" Joint Video Team (JVT) of ISO/IEC MPEG & ITU-T VCEG(ISO/IEC JTC1/SC29/WG11 and ITU-T SG16 06), No. VCEG-030, Jan. 4, 2002, XP030003363 p. 1.

Mathias Wien: "Adaptive Block Transforms (ABT)" Joint Video Team (JVT) of ISO/IEC MPEG & ITU-T VCEG(ISO/IEC JTC1/SC29/WG11 and ITU-T SG16 Q6), No. VCEG-M62, Mar. 28, 2001, XP030003232 pp. 1-2.

Milani, S. et al., Achieving H.264-like compression efficiency with distributed video coding, Visual Communications and Image Processing (VCIP), Jan. 2007.

Naito, S., et al., "Efficient Coding Scheme for Super High Definition Video Based on Extending H.264 High Profile" Proceedings of the SPIE—The International Society for Optical Engineering, SPIE, US vol. 6077., No. 67727 Jan. 18, 2006 pp. 1-8, XP002538136.

Puri, A et al: "Video coding using the H.264/MPEG-4 AVC compression standard" Signal Processing. Image Communication, Elsevier Science Publishers, Amsterdam, NL, vol. 19, No. 9, Oct. 1, 2004, pp. 793-849, XP004607150 ISSN: 0923-5965.

Qualcomm Inc., "Video Coding Using Extended Block Sizes" ITU (International Telecommunication Union) Study Group 16, vol. COM16 C123 E., (Jan. 1, 2009), p. 4pp, XP007912516.

Wien, M et al: "Hybrid video coding using variable size block transforms" Visual Communications and Image Processing; Jan. 21, 2002-Jan. 23, 2002; San Jose, Jan. 21, 2002, XP030080600 abstract sections 1, 3 and 4.

Ye and M Karczewicz (Qualcomm) Y: "Improved intra coding" 33 VCEG Meeting; 82. MPEG Meeting; Oct. 20, 2007; Shenzhen; (Video Coding Experts Group of ITU-T SG.16), Oct. 20, 2007, XP030003615 paragraph [3. VLC coding improvement].

Meeting; 82. MPEG Meeting; Oct. 20, 2007; Shenzhen; (Video Coding Experts Group of ITU-T SG.16), Oct. 20, 2007, XP030003615 paragraph [3. VLC coding improvement].

"Advanced video coding for generic audiovisual services." ITU-T Recommendation H.264, Mar. 2005.

Lee et. al., "Technical considerations for Ad Hoc Group on New Challenges in Video Coding Standardization." ISO/IEC JTC1/SC29/WG11 doc. M1558, Hannover, Germany, Jul. 2008.

Joint video team (JVT) of ISO/IEC MPEG and ITU-T VCEG, 8th, meeting: Geneva Switzerland, May 23-27, 2003, all Pages.

Ono S et al., "Ubiquitous Technology, High-Efficiency Coding of Moving Images—MPEG-4 and H.264-," Ohmsha Ltd., 1st ed., Apr. 20, 2005, pp. 101-120, ISBN: 4-274-20060-4.

Ugur K., "An efficient H.264 based fine-granular-scalable video coding system", Proc. of the IEEE Workshop on Signal Processing Systems Design and Implementation 2005, Nov. 2005, p. 399-402, ISBN:0-7803-9333-3.

Wenger S.,"A High Level Syntax for H.26L: First Results, Technische Universitat Berlin, Department of computer science", 2000.

Xu H., et.al., "Lifting-Based Directional DCT-Like Transform for Image Coding", IEEE Transactions on Circuits and Systems for Video Technology, vol. 17, No. 10, Oct. 2007, pp. 1325-1335, ISSN:1051-8215.

\* cited by examiner

VIDEO CODING USING TRANSFORMS BIGGER THAN 4×4 AND 8×8

CLAIM OF PRIORITY

This application claims the benefit of U.S. Provisional Application No. 61/102,783, filed Oct. 3, 2008, and U.S. Provisional Application No. 61/179,228, filed May 18, 2009, the entire content of each of which is incorporated herein by reference.

BACKGROUND

1. Field of the Invention

The present invention relates to encoding and decoding video data using transform sizes greater than 8×8.

2. Background

Digital video capabilities can be incorporated into a wide range of devices, including digital televisions, digital direct broadcast systems, wireless communication devices such as radio telephone handsets, wireless broadcast systems, personal digital assistants (PDAs), laptop or desktop computers, digital cameras, digital recording devices, video gaming devices, video game consoles, and the like. Digital video devices implement video compression techniques, such as MPEG-2, MPEG-4, or H.264/MPEG-4, Part 10, Advanced Video Coding (AVC), to transmit and receive digital video more efficiently. Video compression techniques perform spatial and temporal prediction to reduce or remove redundancy inherent in video sequences.

Video compression generally includes spatial prediction and/or temporal prediction. In particular, intra-coding relies on spatial prediction to reduce or remove spatial redundancy between video blocks within a given coded unit, which may comprise a video frame, a slice of a video frame, or the like. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of matching video blocks of two or more adjacent coded units.

After spatial or temporal prediction, a residual block is generated by subtracting a prediction video block generated during the prediction process from the original video block that is being coded. The residual block is thus indicative of the differences between the predictive block and the current block being coded. The video encoder may apply transform, quantization and entropy coding processes to further reduce the bit rate associated with communication of the residual block. The transform techniques may change a set of pixel values into transform coefficients, which represent the energy of the pixel values in the frequency domain. Quantization is applied to the transform coefficients, and generally involves a process that limits the number of bits associated with any given coefficient. Prior to entropy encoding, the video encoder scans the quantized coefficient block into a one-dimensional vector of coefficients. The video encoder entropy encodes the vector of quantized transform coefficients to further compress the residual data.

A video decoder may perform entropy decoding operations to retrieve the coefficients. Inverse scanning may also be performed at the decoder to form two-dimensional blocks from received one-dimensional vectors of coefficients. The video decoder then inverse quantizes and inverse transforms the coefficients to obtain the reconstructed residual block. The video decoder then decodes a prediction video block based on prediction information including the motion information. The video decoder then adds the prediction video block to the corresponding reconstructed residual block in order to generate the reconstructed video block and to generate a decoded sequence of video information.

SUMMARY

The system, method, and devices of the application each have several aspects, no single one of which is solely responsible for its desirable attributes. Without limiting the scope of this application as expressed by the claims which follow, its more prominent features will now be discussed briefly. After considering this discussion, and particularly after reading the section entitled "Detailed Description" one will understand how the sample features of this application can provide some improvements that include, among others, for example, improved video coding efficiency.

In one embodiment, there is a method of encoding video data, the method comprising applying spatial prediction or motion compensation to an original video block within a video frame to generate a prediction video block based on a prediction mode; subtracting the prediction video block from the original video block within the video frame to form a residual block; selecting a transform having a first transform size to apply to the residual block; generating header data indicative of the selected transform, the header data comprising a first syntax element having a first value indicative of at least one transform size and a second syntax element indicative of a prediction block size of the prediction video block, wherein the first syntax element and the second syntax element in conjunction are indicative of the first transform size; applying the selected transform to the residual block to generate residual transform coefficients; and generating a video signal based on the header data and the residual transform coefficients.

In another embodiment, there is a method of decoding video data, the method comprising receiving a video signal indicative of at least one block within a frame of video comprising header data for the at least one block and residual transform coefficients for the at least one block, the header data comprising a first syntax element having a first value indicative of at least one transform size and a second syntax element indicative of a prediction block size of the at least one block, wherein the first syntax element and the second syntax element in conjunction are indicative of a transform having a first transform size used to encode the at least one block; applying spatial prediction or motion compensation to the at least one block to generate a prediction video block of the prediction block size of the at least one block; determining the first transform size used to encode the at least one block based on the first syntax element and the second syntax element; applying an inverse transform of the determined first transform size on the residual transform coefficients to obtain a decoded residual block; and adding the decoded residual block to the prediction video block to obtain a decoded video block.

In another embodiment, there is an apparatus for encoding video data, the apparatus comprising means for applying spatial prediction or motion compensation to an original video block within a video frame to generate a prediction video block based on a prediction mode; means for subtracting the prediction video block from the original video block within the video frame to form a residual block; means for selecting a transform having a first transform size to apply to the residual block; means for generating header data indicative of the selected transform, the header data comprising a first syntax element having a first value indicative of at least one transform size and a second syntax element indicative of a prediction block size of the prediction video block, wherein the first syntax element and the second syntax element in conjunction are indicative of the first transform size; means for applying the selected transform to the residual block to generate residual transform coefficients; and means for generating a video signal based on the header data and the residual transform coefficients.

In another embodiment, there is an apparatus for decoding video data, the apparatus comprising means for receiving a video signal indicative of at least one block within a frame of video comprising header data for the at least one block and residual transform coefficients for the at least one block, the header data comprising a first syntax element having a first value indicative of at least one transform size and a second syntax element indicative of a prediction block size of the at least one block, wherein the first syntax element and the second syntax element in conjunction are indicative of a transform having a first transform size used to encode the at least one block; means for applying spatial prediction or motion compensation to the at least one block to generate a prediction video block of the prediction block size of the at least one block; means for determining the first transform size used to encode the at least one block based on the first syntax element and the second syntax element; means for applying an inverse transform of the determined first transform size on the residual transform coefficients to obtain a decoded residual block; and means for adding the decoded residual block to the prediction video block to obtain a decoded video block.

In another embodiment, there is a system of encoding video data, the system comprising a prediction unit configured to apply spatial prediction or motion compensation to an original video block within a video frame to generate a prediction video block based on a prediction mode; a summer configured to subtract the prediction video block from the original video block within the video frame to form a residual block; a processor configured to select a transform having a first transform size to apply to the residual block and generate header data indicative of the selected transform, the header data comprising a first syntax element having a first value indicative of at least one transform size and a second syntax element indicative of a prediction block size of the prediction video block, wherein the first syntax element and the second syntax element in conjunction are indicative of the first transform size; a block transform unit configured to apply the selected transform to the residual block to generate residual transform coefficients; and an entropy encoding unit configured to generate a video signal based on the header data and the residual transform coefficients.

In another embodiment, there is a system of decoding video data, the system comprising a receiver configured to receive a video signal indicative of at least one block within a frame of video comprising header data for the at least one block and residual transform coefficients for the at least one block, the header data comprising a first syntax element having a first value indicative of at least one transform size and a second syntax element indicative of a prediction block size of the at least one block, wherein the first syntax element and the second syntax element in conjunction are indicative of a transform having a first transform size used to encode the at least one block; a prediction unit configured to apply spatial prediction or motion compensation to the at least one block to generate a prediction video block of the prediction block size of the at least one block; a processor configured to determine the first transform size used to encode the at least one block based on the first syntax element and the second syntax element; an inverse transform unit configured to apply an inverse transform of the determined first transform size on the residual transform coefficients to obtain a decoded residual block; and a summer configured to add the decoded residual block to the prediction video block to obtain a decoded video block.

DETAILED DESCRIPTION

The following detailed description is directed to certain specific embodiments. However, the teachings herein can be applied in a multitude of different ways. In this description, reference is made to the drawings wherein like parts are designated with like numerals throughout.

One embodiment is directed to a transform size syntax element for video encoding and decoding. By implementing a set of simplified transform selection rules and guidelines in the encoding and decoding process of image and video signals, it was possible to create a low-bit rate syntax. As described, a transform size syntax is a way of both indicating a particular transform size at an encoder as well as a way of interpreting the transform size at a decoder. A transform size syntax element may be used to indicate the size of transform to be used and can include a flag value comprising a number of bits. Note that the following detailed description may generally use the terms "video," "image," and "picture" interchangeably. Accordingly, the scope of various aspects of the present invention should not be limited by notions of the difference between the terms.

Figure 1:
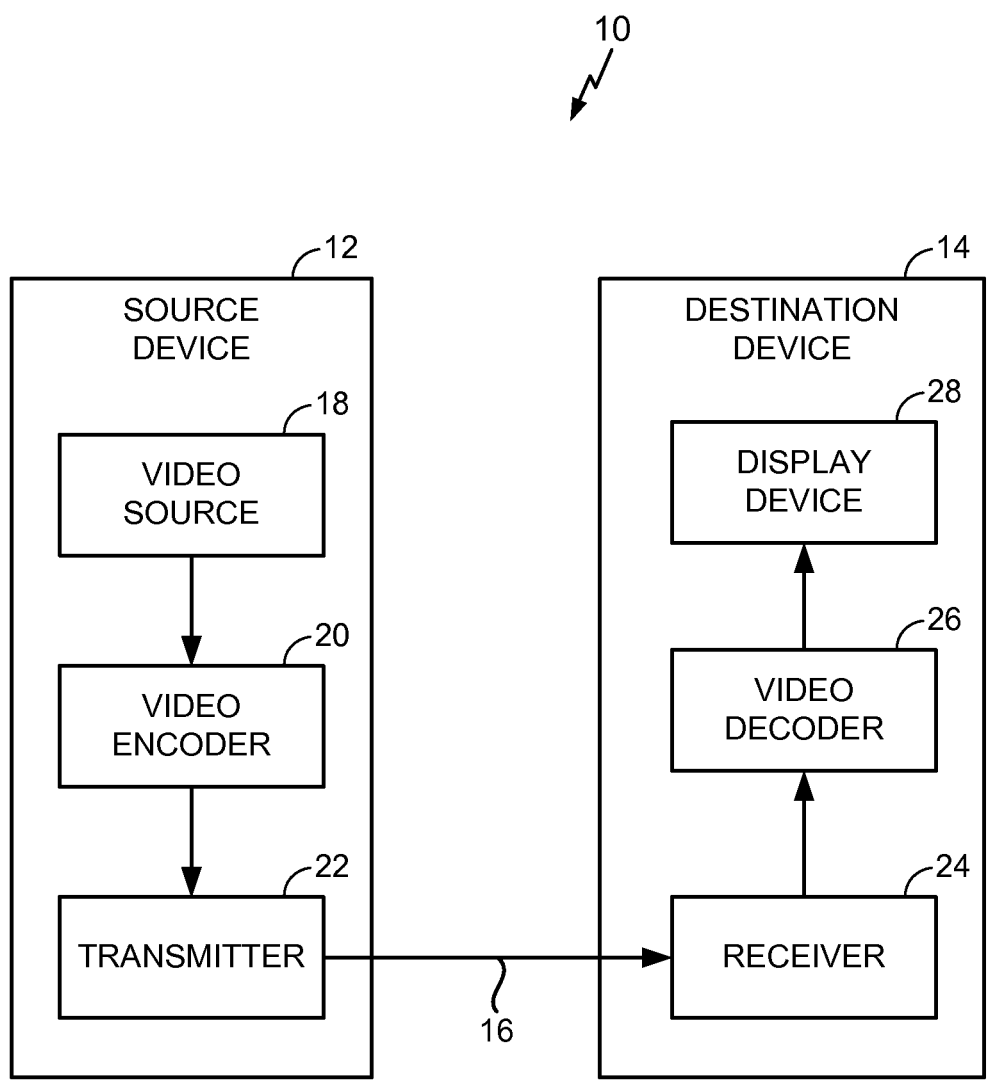
FIG. 1 is a block diagram illustrating a source device and destination device for encoding and decoding of a video signal.

FIG. 1 is a block diagram illustrating a video encoding and decoding system 10 that performs coding techniques as described in this disclosure. As shown in FIG. 1, system 10 includes a source device 12 that transmits encoded video data to a destination device 14 via a communication channel 16. Source device 12 may include a video source 18, a video encoder 20, and a transmitter 22. Video source 18 of source device 12 may include a video capture device, such as a video camera, a video archive containing previously captured video, or a video feed from a video content provider. As a further alternative, video source 18 may generate computer graphics-based data as the source video, or a combination of live video and computer-generated video. In some cases, source device 12 may be a wireless phone or video phone, in which case video source 18 may be a video camera on the phone. In each case, the captured, pre-captured, or computer-generated video may be encoded by video encoder 20 for transmission from source device 12 to destination device 14 via transmitter 22 and communication channel 16.

Video encoder 20 receives video data from video source 18. The video data received from video source 18 may be a series of video frames. Video encoder 20 divides the series of frames into coding units and processes the coding units to encode the series of video frames. The coding units may, for example, be entire frames or portions of the frames (i.e., slices). Thus, in some instances, the frames may be divided into slices. Video encoder 20 divides each coding unit into blocks of pixels (referred to herein as video blocks or blocks) and operates on the video blocks within individual coding units in order to encode the video data. As such, a coding unit (e.g., a frame or slice) may contain multiple video blocks. In other words, a video sequence may include multiple frames, a frame may include multiple slices, and a slice may include multiple video blocks.

The video blocks may have fixed or varying sizes, and may differ in size according to a specified coding standard. As an example, the International Telecommunication Union Standardization Sector (ITU-T) H.264/MPEG-4, Part 10, Advanced Video Coding (AVC) (hereinafter "H.264/MPEG-4 Part 10 AVC" standard) supports intra prediction in various block sizes, such as 16×16, 8×8, or 4×4 pixels for luma components, and 8×8 pixels for chroma components. Inter prediction can be performed in various block sizes, such as 16×16, 16×8, 8×16, 8×8, 8×4, 4×8 and 4×4 pixels for luma components and corresponding scaled sizes for chroma components. In H.264, for example, each video block of 16 by 16 pixels, often referred to as a macroblock (MB), may be subdivided into sub-blocks of smaller sizes and intra or inter predicted in sub-blocks. In general, MBs and the various sub-blocks may be considered to be video blocks. Thus, MBs may be considered to be video blocks, and if partitioned or sub-partitioned, MBs can themselves be considered to define sets of video blocks.

For each of the video blocks, video encoder 20 selects a block type for the block. The block type may indicate whether the block is predicted using inter-prediction or intra-prediction as well as a prediction block size of the block. For example, the H.264/MPEG-4 Part 10 AVC standard supports a number of inter- and intra-prediction block types including Inter 16×16, Inter 16×8, Inter 8×16, Inter 8×8, Inter 8×4, In Inter 4×4, Intra 16×16, Intra 8×8, and Intra 4×4. As described in detail below, video encoder 20 may select one of the block types for each of the video blocks to be encoded.

Video encoder 20 also selects a prediction mode for each of the video blocks. In the case of an intra-coded video block, the prediction mode may determine the manner in which to predict the current video block using one or more previously encoded video blocks. In the H.264/MPEG-4 Part 10 AVC standard, for example, video encoder 20 may select one of nine possible unidirectional prediction modes for each Intra 4×4 block; a vertical prediction mode, horizontal prediction mode, DC prediction mode, diagonal down-left prediction mode, diagonal down-right prediction mode, vertical-right prediction mode, horizontal-down predication mode, vertical-left prediction mode and horizontal-up prediction mode. Similar prediction modes are used to predict each Intra 8×8 block. For an Intra 16×16 block, video encoder 20 may select one of four possible unidirectional modes; a vertical prediction mode, a horizontal prediction mode, a DC prediction mode, and a plane prediction mode. In some instances, video encoder 20 may select the prediction mode from a set of prediction modes that includes not only unidirectional prediction modes, but also one or more multi-directional prediction modes that define combinations of the unidirectional modes. For example, the one or more multi-directional prediction modes may be bidirectional prediction modes that combine two unidirectional prediction modes.

After selecting the prediction mode for the video block, video encoder 20 generates a prediction video block using the selected prediction mode. The prediction video block is subtracted from the original video block to form a residual block. The residual block includes a set of pixel difference values that quantify differences between pixel values of the original video block and pixel values of the generated prediction block. The residual block may be represented in a two-dimensional block format (e.g., a two-dimensional matrix or array of pixel difference values).

Following generation of the residual block, video encoder 20 may perform a number of other operations on the residual block before encoding the block. Video encoder 20 may apply a transform, such as an integer transform, a DCT transform, a directional transform, or a wavelet transform to the residual block of pixel values to produce a block of transform coefficients. The transform coefficients may be a frequency-domain representation of the residual block. Thus, video encoder 20 converts the residual pixel values to transform coefficients (also referred to as residual transform coefficients). The residual transform coefficients may be referred to as a transform block or coefficient block. The residual transform coefficients may be a one-dimensional representation of the coefficients when non-separable transforms are applied or a two-dimensional representation of the coefficients when separable transforms are applied. Non-separable transforms may include non-separable directional transforms. Separable transforms may include separable directional transforms, DCT transforms, integer transforms, and wavelet transforms.

Following transformation, video encoder 20 performs quantization to generate quantized transform coefficients (also referred to as quantized coefficients or quantized residual coefficients). Again, the quantized coefficients may be represented in one-dimensional vector format or two-dimensional block format. Quantization generally refers to a process in which coefficients are quantized to possibly reduce the amount of data used to represent the coefficients. The quantization process may reduce the bit depth associated with some or all of the coefficients. As used herein, the term "coefficients" may represent transform coefficients, quantized coefficients or other type of coefficients. The techniques of this disclosure may, in some instances, be applied to residual pixel values, quantized residual pixel values, as well as transform coefficients and quantized transform coefficients.

When separable transforms are used and the coefficient blocks are represented in a two-dimensional block format, video encoder 20 scans the coefficients from the two-dimensional format to a one-dimensional format. In other words, video encoder 20 may scan the coefficients from the two-dimensional block to serialize the coefficients into a one-dimensional vector of coefficients. In accordance with one of the aspects of this disclosure, video encoder 20 may adjust the scan order used to convert the coefficient block to one dimension based on collected statistics. The statistics may comprise an indication of the likelihood that a given coefficient value in each position of the two-dimensional block is zero or non-zero and may, for example, comprise a count, a probability or other statistical metric associated with each of the coefficient positions of the two-dimensional block. In some instances, statistics may only be collected for a subset of the coefficient positions of the block. When the scan order is evaluated, e.g., after a particular number of blocks, the scan order may be changed such that coefficient positions within the block determined to have a higher probability of having non-zero coefficients are scanned prior to coefficient positions within the block determined to have a lower probability of having non-zero coefficients. In this way, an initial scanning order may be adapted to more efficiently group non-zero coefficients at the beginning of the one-dimensional coefficient vector and zero valued coefficients at the end of the one-dimensional coefficient vector. This may in turn reduce the number of bits spent on entropy coding since there are shorter runs of zeros between non-zeros coefficients at the beginning of the one-dimensional coefficient vector and one longer run of zeros at the end of the one-dimensional coefficient vector.

Following the scanning of the coefficients, video encoder 20 encodes each of the video blocks of the coding unit using any of a variety of entropy coding methodologies, such as context adaptive variable length coding (CAVLC), context adaptive binary arithmetic coding (CABAC), run length coding or the like. Source device 12 transmits the encoded video data to destination device 14 via transmitter 22 and channel 16. Communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting encoded video data from source device 12 to destination device 14.

Destination device 14 may include a receiver 24, video decoder 26, and display device 28. Receiver 24, which is one means of receiving a video signal, receives the encoded video bitstream from source device 12 via channel 16. Video decoder 26 applies entropy decoding to decode the encoded video bitstream to obtain header information, motion vectors, and quantized residual coefficients of the coded video blocks of the coded unit. As described above, the quantized residual coefficients encoded by source device 12 are encoded as a one-dimensional vector. Video decoder 26 therefore scans the quantized residual coefficients of the coded video blocks to convert the one-dimensional vector of coefficients into a two-dimensional block of quantized residual coefficients. Like video encoder 20, video decoder 26 may collect statistics that indicate the likelihood that a given coefficient position in the video block is zero or non-zero and thereby adjust the scan order in the same manner that was used in the encoding process. Accordingly, reciprocal adaptive scan orders can be applied by video decoder 26 in order to convert the one-dimensional vector representation of the serialized quantized transform coefficients back to two-dimensional blocks of quantized transform coefficients.

Video decoder 26 reconstructs each of the blocks of the coding unit using the decoded header information and the decoded residual information. In particular, video decoder 26 may generate a prediction video block for the current video block using the prediction and motion information included as a part of the header information and combine the prediction block with a corresponding residual video block to reconstruct each of the video blocks. Destination device 14 may display the reconstructed video blocks to a user via display device 28. Display device 28 may comprise any of a variety of display devices such as a cathode ray tube (CRT), a liquid crystal display (LCD), a plasma display, a light emitting diode (LED) display, an organic LED display, or another type of display unit.

In some cases, source device 12 and destination device 14 may operate in a substantially symmetrical manner. For example, source device 12 and destination device 14 may each include video encoding and decoding components. Hence, system 10 may support one-way or two-way video transmission between devices 12, 14, e.g., for video streaming, video broadcasting, or video telephony. A device that includes video encoding and decoding components may also form part of a common encoding, archival and playback device such as a digital video recorder (DVR).

Video encoder 20 and video decoder 26 may operate according to any of a variety of video compression standards, such as such as those defined by the Moving Picture Experts Group (MPEG) in MPEG-1, MPEG-2 and MPEG-4, the ITU-T H.263 standard, the H.264/MPEG4 Part 10 AVC standards, the Society of Motion Picture and Television Engineers (SMPTE) 421M video CODEC standard (commonly referred to as "VC-1"), the standard defined by the Audio Video Coding Standard Workgroup of China (commonly referred to as "AVS"), as well as any other video coding standard defined by a standards body or developed by an organization as a proprietary standard. Although not shown in FIG. 1, in some aspects, video encoder 20 and video decoder 26 may each be integrated with an audio encoder and decoder, respectively, and may include appropriate MUX-DEMUX units, or other hardware and software, to handle encoding of both audio and video in a common data stream or separate data streams. In this manner, source device 12 and destination device 14 may operate on multimedia data. If applicable, the MUX-DEMUX units may conform to the ITU H.223 multiplexer protocol, or other protocols such as the user datagram protocol (UDP).

In some aspects, for video broadcasting, the techniques described in this disclosure may be applied to enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," published in July 2007 as Technical Standard TIA-1099 (the "FLO Specification"). That is to say, communication channel 16 may comprise a wireless information channel used to broadcast wireless video information according to the FLO Specification, or the like. The FLO Specification includes examples defining bitstream syntax and semantics and decoding processes suitable for the FLO Air Interface.

Alternatively, video may be broadcasted according to other standards such as DVB-H (digital video broadcast-handheld), ISDB-T (integrated services digital broadcast-terrestrial), or DMB (digital media broadcast). Hence, source device 12 may be a mobile wireless terminal, a video streaming server, or a video broadcast server. However, techniques described in this disclosure are not limited to any particular type of broadcast, multicast, or point-to-point system. In the case of broadcast, source device 12 may broadcast several channels of video data to multiple destination devices, each of which may be similar to destination device 14 of FIG. 1. Thus, although a single destination device 14 is shown in FIG. 1, for video broadcasting applications, source device 12 would typically broadcast the video content simultaneously to many destination devices.

In other examples, transmitter 22, communication channel 16, and receiver 24 may be configured for communication according to any wired or wireless communication system, including one or more of a Ethernet, telephone (e.g., POTS), cable, power-line, and fiber optic systems, and/or a wireless system comprising one or more of a code division multiple access (CDMA or CDMA2000) communication system, a frequency division multiple access (FDMA) system, an orthogonal frequency division multiple (OFDM) access system, a time division multiple access (TDMA) system such as GSM (Global System for Mobile Communication), GPRS (General packet Radio Service), or EDGE (enhanced data GSM environment), a TETRA (Terrestrial Trunked Radio) mobile telephone system, a wideband code division multiple access (WCDMA) system, a high data rate 1xEV-DO (First generation Evolution Data Only) or 1xEV-DO Gold Multicast system, an IEEE 802.18 system, a MediaFLO™ system, a DMB system, a DVB-H system, or another scheme for data communication between two or more devices.

Video encoder 20 and video decoder 26 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 26 may be included in one or more encoders or decoders, either of which may be integrated as part of a combined encoder/decoder (CODEC) in a respective mobile device, subscriber device, broadcast device, server, or the like. In addition, source device 12 and destination device 14 each may include appropriate modulation, demodulation, frequency conversion, filtering, and amplifier components for transmission and reception of encoded video, as applicable, including radio frequency (RF) wireless components and antennas sufficient to support wireless communication. For ease of illustration, however, such components are summarized as being transmitter 22 of source device 12 and receiver 24 of destination device 14 in FIG. 1.

Figure 2:
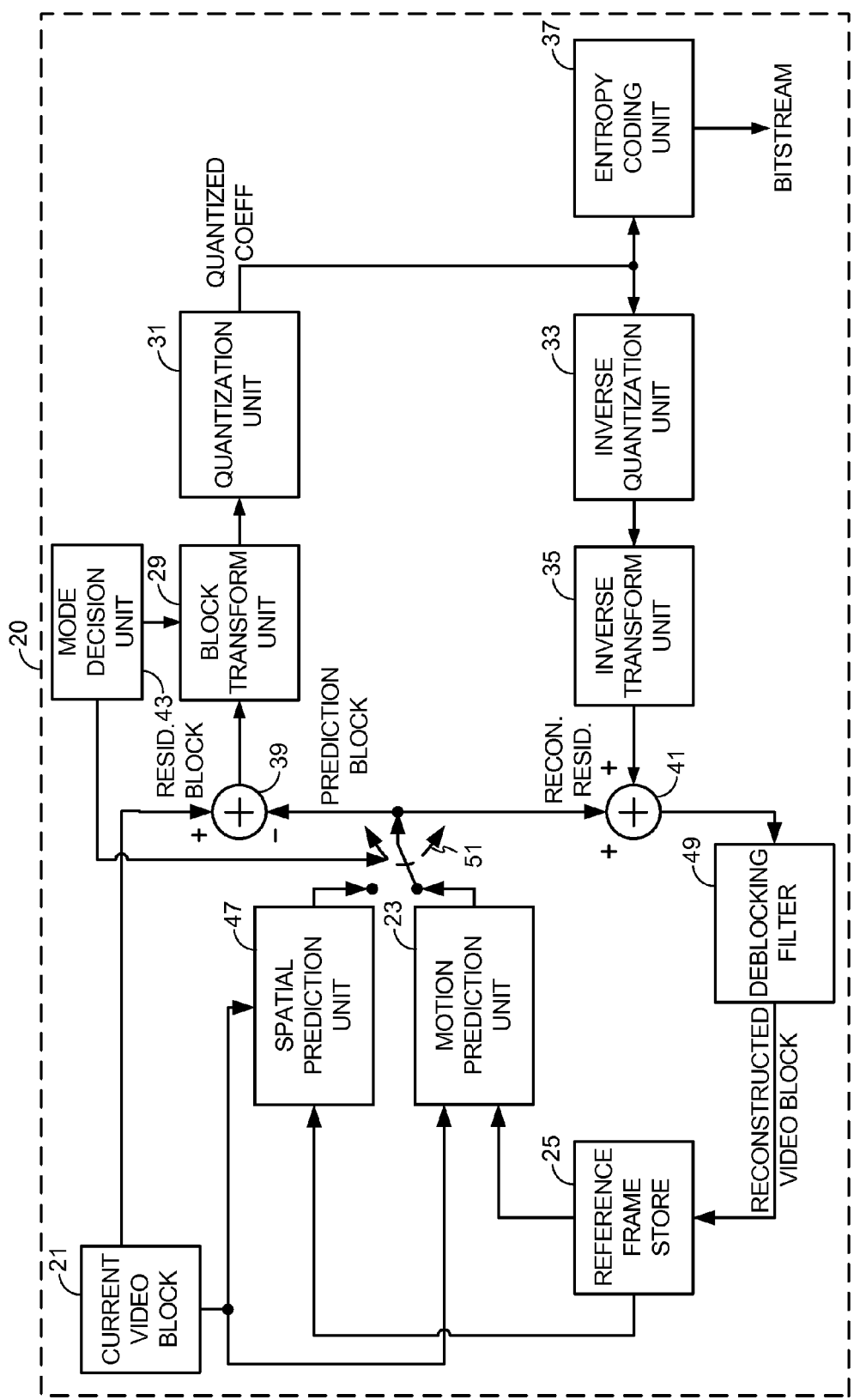
FIG. 2 is a block diagram of an embodiment of the video encoder of FIG. 1.

FIG. 2 is a block diagram illustrating an example of a video encoder 20. Video decoder 26 may include similar components to video encoder 20. Video encoder 20 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames. For inter-coding, video encoder 20 performs motion estimation to track the movement of matching video blocks between two or more adjacent frames.

As shown in FIG. 2, video encoder 20 receives a current video block 21 within a video frame to be encoded. In the example of FIG. 2, video encoder 20 includes motion prediction unit 23, reference frame store 25, block transform unit 29, quantization unit 31, inverse quantization unit 33, inverse transform unit 35, entropy coding unit 37, mode decision unit 43, spatial prediction unit 47, and deblocking filter 49. Video encoder 20 also includes summer 39, summer 41, and switch 51. Video encoder 20 may also include a scanning unit, which is not shown, for scanning the quantized coefficients. FIG. 2 illustrates the temporal prediction components of video encoder 20 for inter-coding of video blocks and spatial prediction components for intra-coding of video blocks. Switch 51 may be controlled by mode decision unit 43 and may be used to choose between the spatial prediction video block or the temporal prediction video block as the prediction video block for the input video block.

To evaluate inter-coding, motion prediction unit 23 compares video block 21 to blocks in one or more adjacent video frames to generate one or more motion vectors. The adjacent frame or frames may be retrieved from reference frame store 25. Motion estimation may be performed for blocks of variable sizes, e.g., 16×16, 16×8, 8×16, 8×8 or smaller block sizes. Motion prediction unit 23 identifies a block in an adjacent frame that most closely matches the current video block 21, e.g., based on a rate distortion model, and determines a displacement between the blocks. On this basis, motion prediction unit 23 produces a motion vector that indicates the magnitude and trajectory of the displacement.

Motion vectors may have half- or quarter-pixel precision, or even finer precision, allowing video encoder 20 to track motion with higher precision than integer pixel locations and obtain a better prediction block. When motion vectors with fractional pixel values are used, interpolation operations may be carried out in motion prediction unit 23. For example, in the AVC/H.264 standard, to obtain a luma signal at half-pixel positions, the 6-tap Wiener filter with coefficients (1, −5, 20, 20, −5, 1)/32 may be used. To obtain luma signals at quarter-pixel locations, bilinear filtering on the values at integer pixel locations and the interpolated values at half pixel locations may be used. The bilinear filter also may be used in fractional pixel interpolation for the chroma components, which may have up to ⅛-pixel precision. After identifying the best motion vector for a video block using a rate-distortion model, motion prediction unit 23 outputs a prediction video block by motion compensation.

In the alternative, to evaluate intra-coding, spatial prediction unit 47 is used to form a prediction video block using the already coded blocks in the same coding unit (e.g., the same frame). For example, video block 21 may be compared to other already coded blocks in the same frame as video block 21. In some embodiments, the already coded blocks may be retrieved from reference frame store 25. In some embodiments, various spatial prediction methods may be used. For example, in H.264/MPEG-4 AVC, directional spatial prediction may be performed on video blocks of sizes 4×4, 8×8, and/or 16×16. Further, a total of 9 prediction directions may be used for 4×4 and 8×8 luminance blocks. A total of 4 prediction directions may be used for 16×16 luminance blocks and chrominance blocks. Other types of spatial prediction may be performed within the same coding unit. For example, a matching video block for the current video block may be identified in the already coded portion of the current coding unit using a process similar to motion estimation. Further, the amount of displacement between the matching video block and the current video block may be determined and then signaled as part of the coded video header data for the current video block. Mode decision unit 43 may select the optimal spatial prediction mode (e.g., prediction block size, prediction direction, or displacement of the prediction video block, etc) based on pre-defined criteria, such as a Lagrangian rate distortion model.

Video encoder 20 forms a residual video block by subtracting the prediction video block produced by either motion prediction unit 23 or spatial prediction unit 47 from the original, current video block 21 at summer 39, which is one means for subtracting the prediction block from the original block. Block transform unit 29, which is one means for applying a transform, applies a transform to the residual block. The size and type of transform to be used may be indicated to the block transform unit 29 by mode decision unit 43. Quantization unit 31 quantizes the transform coefficients to further reduce bit rate. Entropy coding unit 37, which is one means for generating a video signal, entropy codes the quantized coefficients to even further reduce bit rate. Video decoder 26 performs inverse operations to reconstruct the encoded video.

Inverse quantization unit 33 and inverse transform unit 35 apply inverse quantization and inverse transformation, respectively, to reconstruct the residual block. Summer 41 adds the reconstructed residual block to the prediction block to produce a reconstructed video block for storage in reference frame store 25. The reconstructed video block is used by either motion prediction unit 23, or spatial prediction unit 47, to encode subsequent video blocks in the current video frame or a subsequent video frame.

When performing motion compensation for a given block in the current video frame 21, motion prediction unit 23 may use a fixed set of filters to interpolate a reference block from a reference frame. One reference block is needed if the current block is uni-directionally predicted or two reference blocks are needed if the current block is bi-directionally predicted. In H.264, multiple reference frames in forward and backward directions may be used in some cases. The actual filters used in motion prediction unit 23 depend on the fractional part of the motion vector. For example, if the motion vector points to a half-pixel location in the reference frame in a given dimension, to obtain the value of the half-pixel location, a 6-tap filter such as (1, −5, 20, 20, −5, 1)/32 is used in that dimension with a half-pixel motion vector. If both motion vector components point to integer locations, the pixel values from the reference frame in reference frame store 25 may be used directly without performing any interpolation filtering operation.

Figure 7:
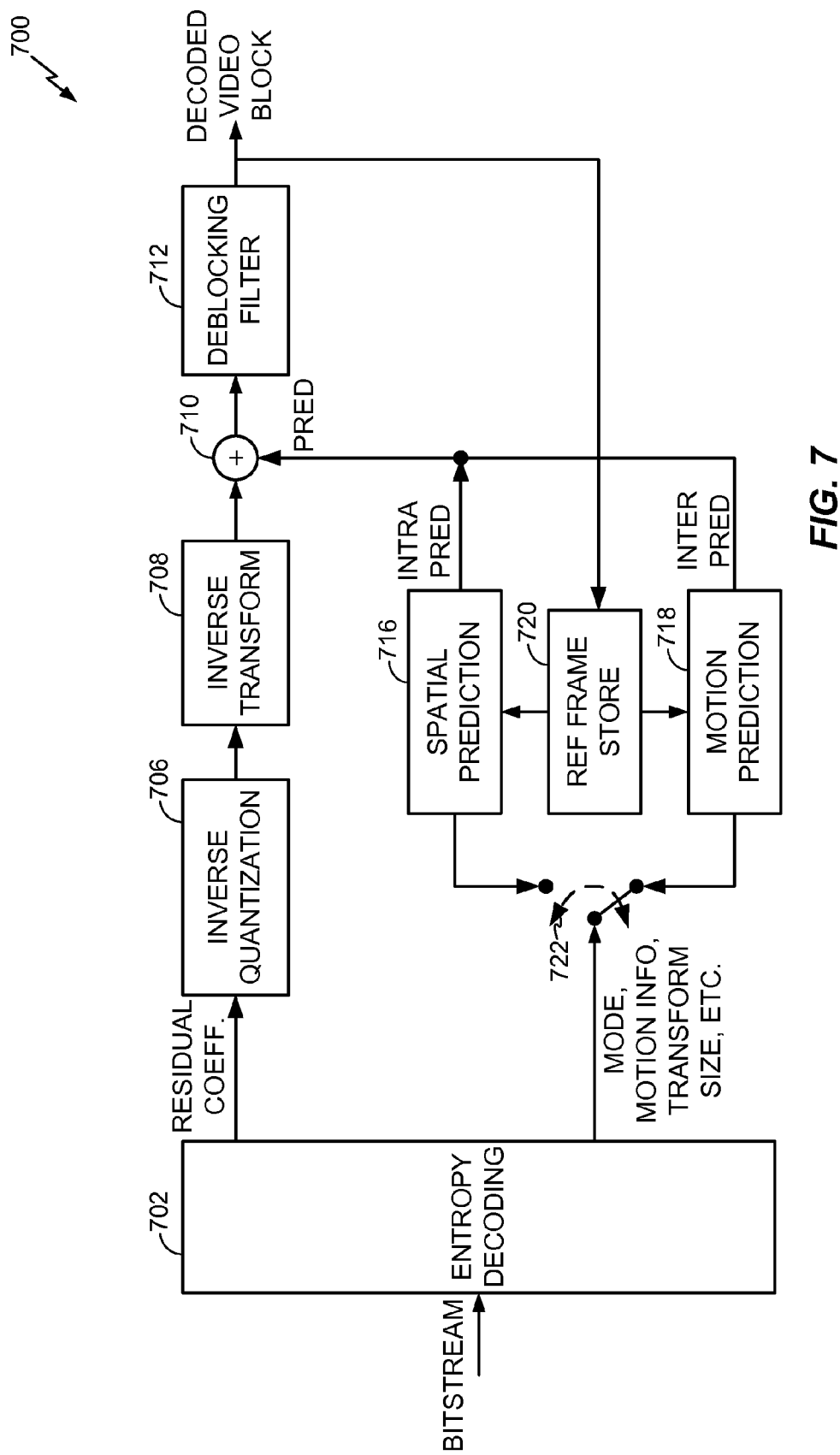
FIG. 7 is a block diagram of an embodiment of the video decoder of FIG. 1.

FIG. 7 is a block diagram illustrating an example of a video decoder 26. The encoded bitstream is fed into the system 700. Portions of the bitstream may correspond to different video blocks. Further, several of those video blocks may make up a single video frame. A portion of the bitstream corresponding to a given video block is entropy decoded at entropy decoding unit 702 to form the residual block comprising of quantized residual transform coefficients. The residual block then may be inverse-scanned at an inverse-scanning unit, which is not shown. The residual block may also be inverse-quantized at inverse-quantization unit 706 and inverse-transformed at inverse-transform unit 708 to form the decoded residual block. Entropy decoding unit 702 may determine the type and/or size of inverse transform to perform based on received header data as discussed below. A prediction video block is generated and added to the decoded residual block at adding unit 710.

The prediction video block may be formed using one of two types of prediction methods—Intra and Inter. Spatial prediction unit 716 uses the already coded blocks in the same video frame (or in the same video slice if a video slice is used as a coding unit) to generate the intra prediction block. Motion compensation unit 718 uses the previous and/or future frames stored at reference frame store 720 to generate the inter prediction block. Depending on the received header data indicative of the coding mode used to encode the video block, switch 722 can be switched to invoke either the spatial prediction unit 716 or the motion compensation unit 718 to generate either intra or inter predictor block. The predictor block is then added to the decoded residual block at adding unit 710 to generate the decoded video block.

The resulting reconstructed video block is then sent to deblock filtering unit 712 where it may be filtered at block edges to prevent blocking artifacts that may be visually unappealing. The output generated is the final decoded video block. The final decoded video block may be stored in reference frame store 720 for reconstruction of other video blocks in the same or other video frames.

In order to properly decode an encoded video stream, the decoder should know what type of transform was used to encode the video data. The decoder may then apply the appropriate inverse transform that corresponds to the forward transform used at the encoder. Accordingly, data indicative of the type of transform used to encode the video block needs to be sent to the decoder as a part of the video bitstream to properly decode the video block.

As described with respect to FIG. 2, block transform unit 29 applies a transform to a residual video block. Applying transforms on the residual blocks provides desired energy compaction which, when combined with quantization and entropy coding, enables high compression efficiency. Examples of transforms used in popular block-based video coding systems such as MPEG2 and H.264/AVC include the 8×8 DCT transform and the 4×4 and 8×8 integer transforms.

The H.264/AVC standard is the latest video coding standard that provides high coding efficiency. H.264/AVC uses various types of block transforms. For intra (spatial prediction) and inter (temporal prediction) predicted blocks, H.264/AVC uses a 4×4 integer transform that is based on a 4×4 DCT transform or an 8×8 integer transform that is based on an 8×8 DCT transform.

For the chrominance signal of the video signal, an additional level of 2×2 Hadamard transform is applied on the 2×2 DC components in each block.

For the luminance signal of the video signal, the transforms are selected as follows. First it is determined if the block is intra- or inter-predicted. If the block is inter predicted, it is next determined if the block size is smaller than 8×8. If the block is smaller than 8×8, a 4×4 integer transform is used. If the block is not smaller than 8×8, either a 4×4 or 8×8 integer transform is used.

If the block is intra-predicted, it is determined if the block is predicted using INTRA__16×16 mode. If the block is predicted using INTRA__16×16 mode, a 4×4 integer transform is applied to the block and an additional level of 4×4 Hadamard transform is applied on the 4×4 DC components in each block. If the block is not predicted using INTRA__16×16 mode, a 4×4 integer transform is used if the block is predicted using INTRA__4×4 mode and an 8×8 integer transform is used if the block is predicted using INTRA__8×8 mode.

In the cases where either a 4×4 or 8×8 transform may be used on the block, the choice of transform depends on the H.264/AVC profile being used. Under any H.264 profile other than the high profile (for example, baseline profile, extended baseline profile, main profile) only a 4×4 integer transform is used. Under the H.264/AVC high profile (i.e., Fidelity Range Extension), an 8×8 integer transform based on an 8×8 DCT transform also can be used on the luminance signal. The choice of either the 4×4 or the 8×8 integer transform is signaled by an additional syntax element, transform_size__8×8_flag. In the cases where either a 4×4 or 8×8 transform may be used (for example, an inter-coded block with size no smaller than 8×8), the transform_size__8×8_flag is sent along with the encoded video data to the decoder. If the transform_size__8×8_flag is set to 1, then the 8×8 integer transform is applied on the residual blocks; otherwise (if the transform_size__8×8_flag is set to 0), the 4×4 integer transform is applied on the residual blocks.

In H.264/AVC, motion prediction may be performed on various block sizes (i.e., motion partitions), such as 16×16, 16×8, 8×16, 8×8, 8×4, 4×8, and 4×4. While smaller motion partitions are usually used around object edges and areas with lots of detail, larger motion partitions are usually chosen around smoother areas. As a result, the residual blocks after motion prediction are also usually smoother, i.e., they tend to contain more low frequency components. For such signals, applying bigger transforms can provide better energy compaction. Methods and encoders for choosing a motion partition and transform size are described in U.S. Pat. No. 5,107, 345; U.S. Pat. No. 6,996,283; and U.S. Pat. No. 6,600,836 all hereby incorporated by reference. As described above, H.264/AVC uses only 4×4 and 8×8 integer transforms for video blocks that are inter-coded. The 4×4 and 8×8 integer transforms are indicated by the value of the transform_size_8×8_flag, which currently is limited to a 1-bit size. Accordingly, there is no way to indicate additional transform sizes with the current syntax used in H.264 because the 1-bit transform_size_8×8_flag can only signal two types of transforms. Syntaxes and syntax elements are described below that allow for indication of additional transform sizes used by the encoder and the decoder. In some embodiments, the syntax element comprises a 2-bit flag value to indicate the transform size. The flag value may be included as part of the header information sent to the decoder.

In the following embodiments, an inter-predicted video block or an intra-predicted video block may be used in conjunction with the described methods. That is, the prediction block of the video block may be formed by motion compensation or spatial prediction. In the embodiments where motion compensation is used, prediction block size is equal to motion partition size; therefore the terms "prediction block" and "motion partition" may be used interchangeably. Further, in the embodiments where spatial prediction is used, prediction block size is equal to the size of the spatial prediction block used. Therefore the terms "prediction block" and "intra-prediction block" or "spatial prediction block" may be used interchangeably. For example, multiple transform choices may be used for video blocks coded using INTRA_16×16 and INTRA_8×8 prediction. In addition to 4×4 transform, 16×16, 16×8, 8×16, or 8×8 transforms may be applied to INTRA_16×16 predicted video blocks; and 8×8 transform may be applied to INTRA_8×8 predicted video blocks. For intra-predicted blocks, signaling of the transform size may be done in a similar manner to inter-predicted video blocks. The transform size flag syntax elements may be combined with the prediction block size syntax elements; and variable length coding of the transform size flag syntax elements may be used.

The syntaxes described below use both the flag value as well as the prediction block size of a given block to indicate the transform size. The combination of the prediction block size of the block and the flag value allow for indication of more transform sizes than when using a 1-to-1 correspondence between a flag value and transform size. For example, in a 1-to-1 correspondence between transform size and flag value, a 2-bit flag would only indicate 4 different transform sizes, where each flag value indicates a single transform size. However, by further utilizing the prediction block size of the block, additional transform sizes may be indicated using the same number of bits for the flag. For example, if the flag value 00 indicates that the transform size should equal the prediction block size of the block, and the prediction block size may be of N different block sizes, the single flag value 00 may indicate N different transform sizes. Accordingly, in one embodiment, one or more of the flag values may indicate that the transform size being used equals the prediction block size e of the block. In another embodiment, variable length coding may be used to code the flag value.

Figure 3:
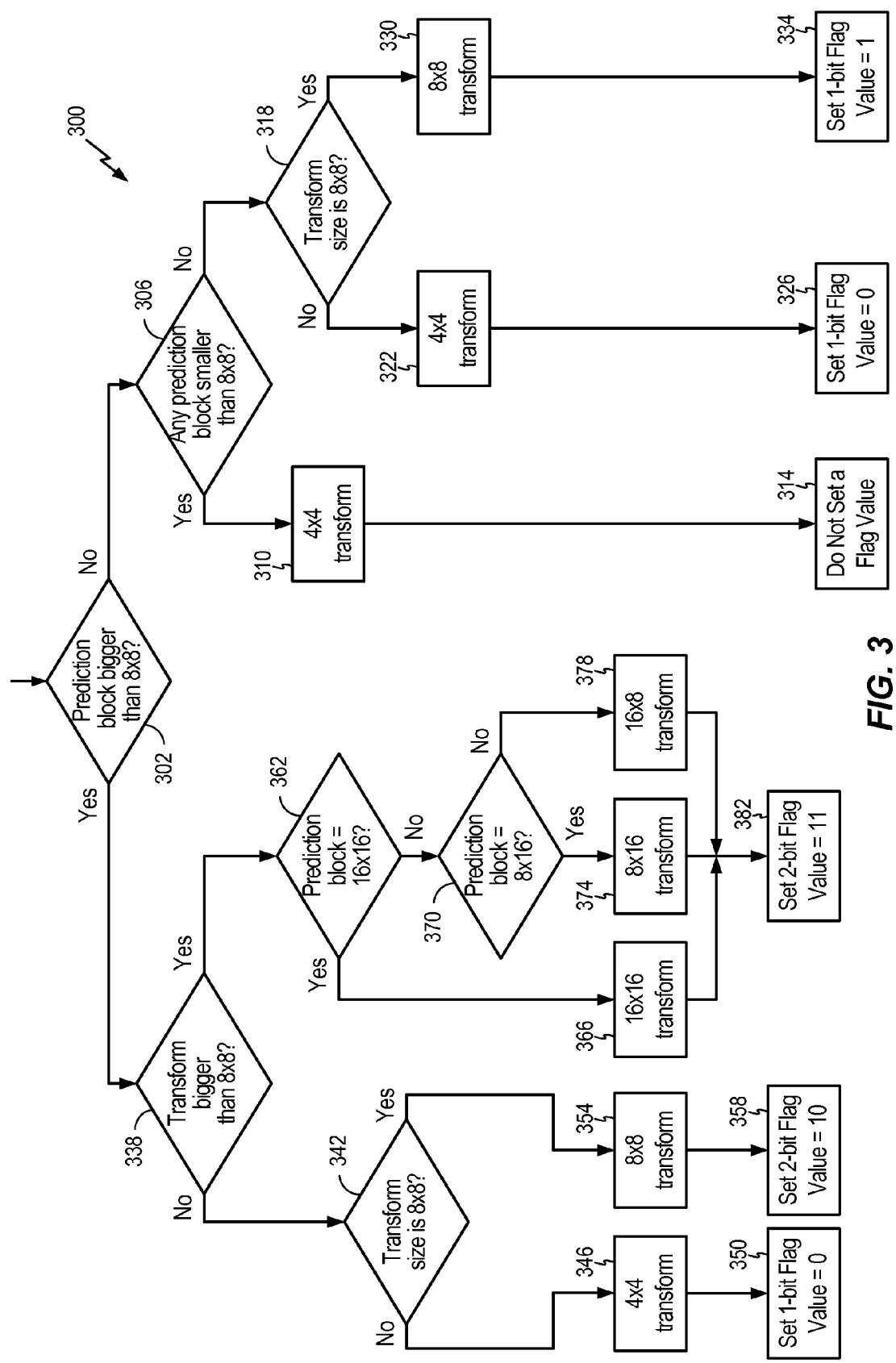
FIG. 3 is a flowchart of an embodiment of a process of setting the flag value for signaling to the decoder of FIG. 1 the type of transform used by the encoder of FIG. 1.

FIG. 3 is an exemplary embodiment of a process 300 of setting a flag value at an encoder that signals the transform size used by the encoder 20 for a given video block. The prediction block size of each video block may be determined at mode decision unit 43, and the transform may be performed at block transform unit 29 (See FIG. 2). The choice of prediction block size and the choice of transform size used on a block may be made by mode decision unit 43. At a first step 302 of process 300, it is determined if the prediction block size for the given block is greater than 8×8. If the prediction block size is not greater than 8×8, the process continues to step 306. Alternatively, if the prediction block size is greater than 8×8, the process proceeds to step 338.

At step 306, it is determined if the prediction block size is less than 8×8. If the prediction block size is less than 8×8, the process 300 proceeds to step 310, wherein a 4×4 transform is applied to the block. The process 300 then continues to a step 314 where no flag value is set to be sent to the decoder. Alternatively, if the prediction block size is determined not to be smaller than 8×8 at step 306, the process proceeds to a step 318, wherein it is determined if the transform size to be used on the block is 8×8. If it is determined that an 8×8 transform size is not to be used, process 300 continues to step 322 where a 4×4 transform is applied to the block, and then to a step 326 where a 1-bit flag with a value of 0 is set to be sent to the decoder. In the alternative, at step 318 it is determined that an 8×8 transform is to be used, the process continues to step 330 wherein an 8×8 transform is applied to the block, and then to a step 334 where a 1-bit flag with a value of 1 is set to be sent to the decoder.

If at step 302, it is determined the prediction block size is greater than 8×8, the process proceeds to step 338. At step 338 it is determined at the encoder, either automatically or manually, if a transform size greater than 8×8 is to be used on the given block. If a transform size greater than 8×8 is not to be used, process 300 continues to step 342 where it is determined if the transform size to be used on the given block is 8×8. If the transform size to be used is not 8×8, process 300 continues to step 346 where a 4×4 transform is applied to the block, and then to step 350 where a 1-bit flag value of 0 is set to be sent to the decoder. In the alternative, if the transform size to be used is 8×8, process 300 continues to step 354 where an 8×8 transform is applied to the block, and then to step 358 where a 2-bit flag value of 10 is set to be sent to the decoder.

If at step 338 it is determined the transform size to be used is greater than 8×8, process 300 continues to step 362. At step 362 it is determined if the prediction block size of the given block is 16×16. If it is determined the prediction block size is 16×16, process 300 proceeds to step 366 where a 16×16 transform is applied to the block, and then to step 382. Alternatively, if at step 362 it is determined the prediction block size is not 16×16, process 300 continues to step 370 where it is determined if the prediction block size is 8×16. If it is determined the prediction block size is 8×16, process 300 continues to a next step 374 where an 8×16 transform is applied to the block, and then to step 382. Alternatively, if it is determined the prediction block size is not 8×16, process 300 continues to a next step 374 where a 16×8 transform is applied to the block, and then to step 382. At step 382 a 2-bit flag value of 11 is set to be sent to the decoder.

According to the process 300, the flag values correspond to the following transform types:

TABLE 1

| Flag Value | Prediction Block Size | Transform/Inverse Transform Size |
|---|---|---|
| No Flag | 4x4, 4x8, 8x4 | 4x4 |
| 0 | 8x8 | 4x4 |
| 1 | 8x8 | 8x8 |
| 0 | 8x8, 8x16, 16x8, 16x16 | 4x4 |
| 10 | 8x8, 8x16, 16x8, 16x16 | 8x8 |

TABLE 1-continued

| Flag Value | Prediction Block Size | Transform/Inverse Transform Size |
|---|---|---|
| 11 | 8x16 | 8x16 |
| 11 | 16x8 | 16x8 |
| 11 | 16x16 | 16x16 |

One of ordinary skill in the art will recognize that some of the steps of process 300 may be omitted or new steps added to achieve the same result. Further, some of the steps may be done in a different order. It should also be noted that the flag values may be rearranged (e.g., 0 is an 8×8 transform and 10 is a 4×4 transform).

Figure 4:
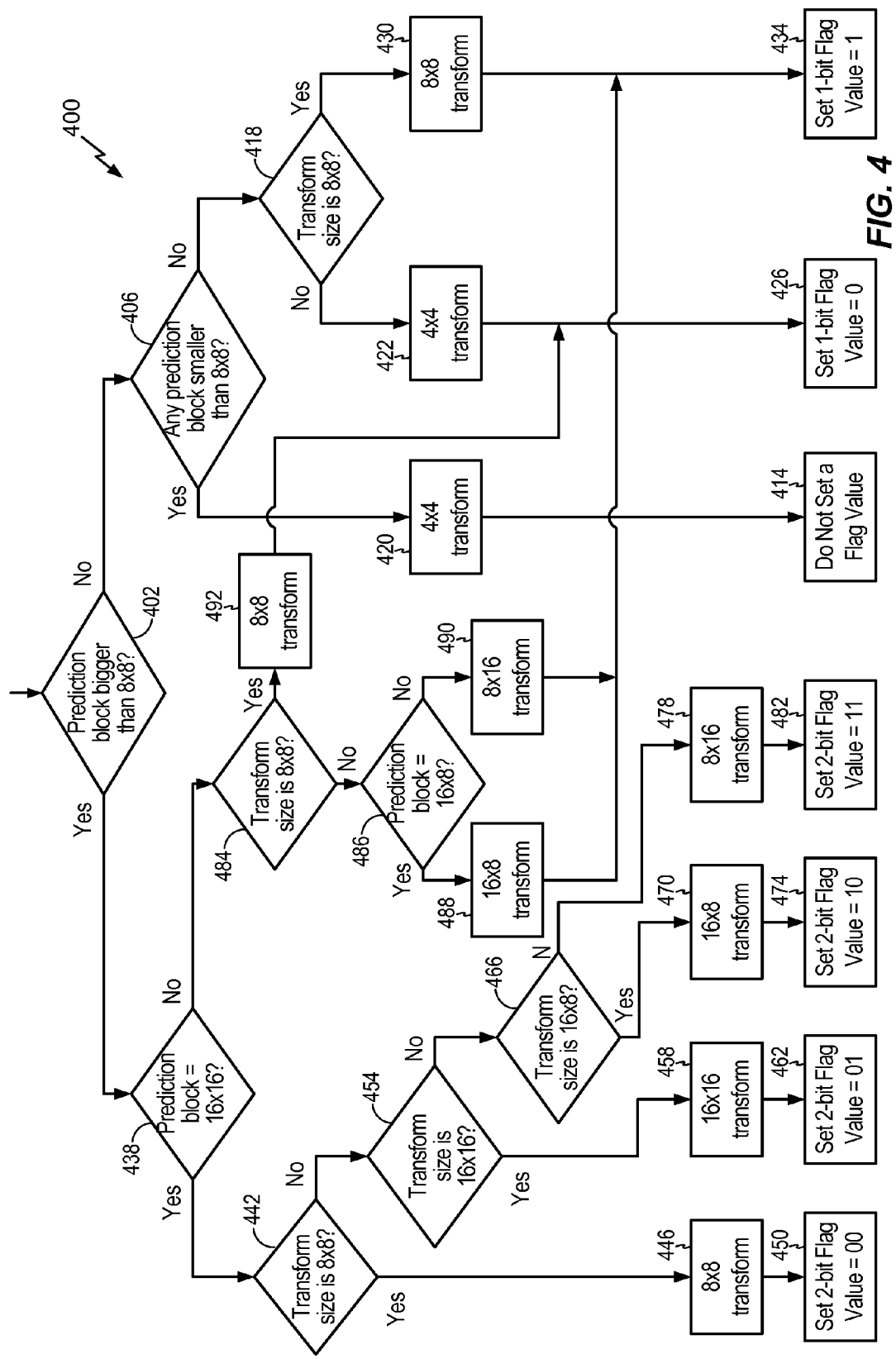
FIG. 4 is a flowchart of another embodiment of a process of setting the flag value for signaling to the decoder of FIG. 1 the type of transform used by the encoder of FIG. 1.

FIG. 4 is an exemplary embodiment of another process 400 of setting a flag value at an encoder signaling the transform size used by the encoder 20 for a given video block. The prediction block size may be determined at mode decision unit 43, and the transform may be performed at block transform unit 29. The choice of prediction block size and the choice of transform size used on a block are made by the mode decision unit 43. At a first step 402 of process 400, it is determined if the prediction block size for the given block is greater than 8×8. If the prediction block size is not greater than 8×8, the process continues to step 406. Alternatively, if the prediction block size is greater than 8×8, the process proceeds to step 438.

At step 406, it is determined if the prediction block size is less than 8×8. If the prediction block size is less than 8×8, the process 400 proceeds to step 410, wherein a 4×4 transform is applied to the block. The process 400 then continues to a step 414 where no flag value is set to be sent to the decoder. Alternatively, if the prediction block size is determined not to be smaller than 8×8 at step 406, the process proceeds to a step 418, wherein it is determined if the transform size to be used on the block is 8×8. If it is determined that an 8×8 transform size is not to be used, process 400 continues to step 422 where a 4×4 transform is applied to the block, and then to a step 426 where a 1-bit flag with a value of 0 is set to be sent to the decoder. In the alternative, at step 418 it is determined that an 8×8 transform is to be used, the process continues to step 430 wherein an 8×8 transform is applied to the block, and then to a step 434 where a 1-bit flag with a value of 1 is set to be sent to the decoder.

If at step 402, it is determined the prediction block size is greater than 8×8, the process proceeds to step 438. At step 438 it is determined if the prediction block size is 16×16. If the prediction block size is 16×16, process 400 proceeds to step 442 where it is determined if the transform size to be applied to the block is 8×8. If it is determined the transform size to be used is 8×8, process 400 proceeds to step 446 where an 8×8 transform is applied to the given block, and then to step 450 where a two-bit flag with a value of 00 is set to be sent to the decoder. Alternatively, if at step 442 it is determined the transform size to be applied is not 8×8, process 442 proceeds to step 454 where it is determined if a 16×16 transform is to be applied to the block. If a 16×16 transform is to be applied, the process 400 continues to step 458 where a 16×16 transform is applied to the given block, and then to step 462 where a two-bit flag with a value of 01 is set to be sent to the decoder. If instead at step 454 it is determined the transform size to be applied is not 16×16, process 400 continues to step 466 where it is determined if the transform size to be applied to the given block is 16×8. If the transform size to be applied is 16×8, process 400 continues to step 470 where a 16×8 transform is applied to the given block, and then to step 474 where a two-bit flag with a value of 10 is set to be sent to the decoder. In the alternative, if at step 466 it is determined the transform size to be applied to the block is not 16×8, process 400 continues to step 478 where an 8×16 transform is applied to the given block, and then to step 482 where a two-bit flag with a value of 11 is set to be sent to the decoder.

If at step 438 it is determined the prediction block size is not 16×16, process 400 continues to a step 484 where it is determined if the transform size to be applied to the given block is 8×8. If the transform to be applied is 8×8, process 400 continues to step 492 where an 8×8 transform is applied to the block and then to step 426 where a 1-bit flag value of 0 is set to be sent to the decoder. In the alternative, if at step 484 it is determined the transform size to be applied to the block is not 8×8, the process continues to step 486 where it is determined if the prediction block size is 16×8. If the prediction block size is 16×8, process 400 continues to step 488 where a 16×8 transform is performed on the block, and then to step 434. In the alternative, if at step 486 it is determined the prediction block size is not 16×8, process 400 continues to step 490 where an 8×16 transform is performed on the block, and then to step 434. At step 434 a one-bit flag with a value of 1 is set to be sent to the decoder.

According to the process 400, the flag values correspond to the following transform types:

TABLE 2

| Flag Value | Prediction Block Size | Transform/Inverse Transform Size |
|---|---|---|
| No Flag | 4x4, 4x8, 8x4 | 4x4 |
| 0 | 8x8 | 4x4 |
| 0 | 8x16, 16x8 | 8x8 |
| 1 | 8x8 | 8x8 |
| 1 | 8x16 | 8x16 |
| 1 | 16x8 | 16x8 |
| 00 | 16x16 | 8x8 |
| 01 | 16x16 | 16x16 |
| 10 | 16x16 | 16x8 |
| 11 | 16x16 | 8x16 |

One of ordinary skill in the art will recognize that some of the steps of process 400 may be omitted or new steps added to achieve the same result. Further, some of the steps may be done in a different order. It should also be noted that the flag values may be rearranged (e.g., 00 is a 16×16 transform and 01 is an 8×8 transform).

Figure 5:
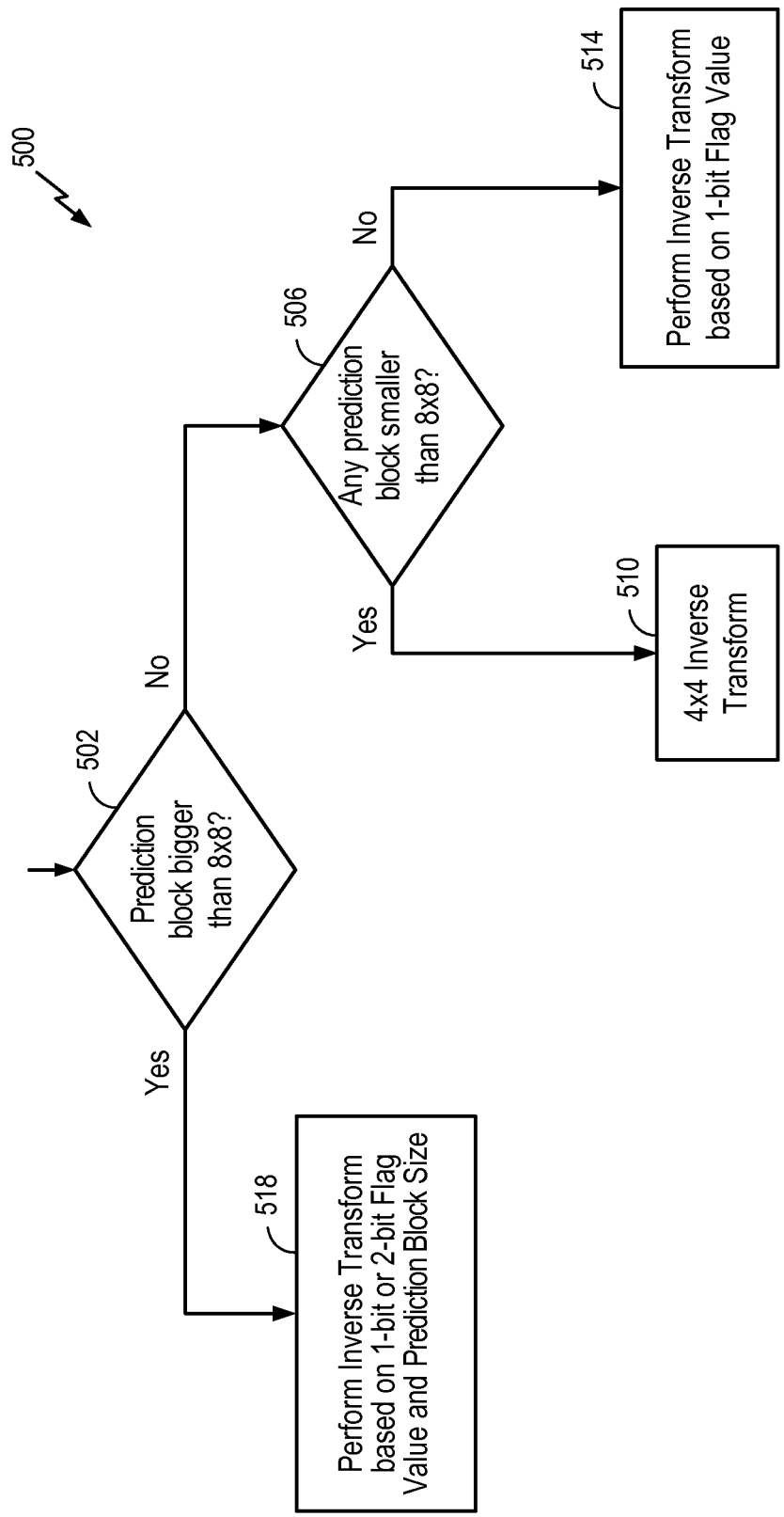
FIG. 5 is a flowchart of an embodiment of a process of selecting the correct inverse transform for decoding video data encoded according to the process of FIG. 3.

FIG. 5 is an exemplary embodiment of a process 500 for performing an inverse transform at a decoder 26 on a block encoded by an encoder 20 using process 300. Decoder 26, which may include, amongst other components, an entropy decoding unit, a spatial prediction unit, a motion compensation unit, an inverse quantization unit, an inverse transform unit, an entropy decoding unit and a summer, is one means of performing the steps of process 500. Further, the various components of decoder 26 may be used to perform different steps of process 500. At step 502 it is determined if the prediction block size is greater than 8×8. If the prediction block size is greater than 8×8, the process proceeds to a step 518 where the decoder looks for a 1-bit or 2-bit flag value and performs an inverse transform based on the flag value and the prediction block size. The type of inverse transform to be used is shown in Table 1. Alternatively, if at step 502 it is determined the prediction block size is not greater than 8×8, process 500 continues to step 506 where it is determined if the prediction block size is smaller than 8×8. If the prediction block size is smaller than 8×8, process 500 proceeds to a next step 510 where a 4×4 inverse transform is performed. If instead at step 506 it is determined the prediction block size is not smaller than 8×8, the process proceeds to a step 514 where the decoder looks for a 1-bit flag value and performs an inverse transform based on the flag value. The type of inverse transform to be used is shown in Table 1.

Figure 6:
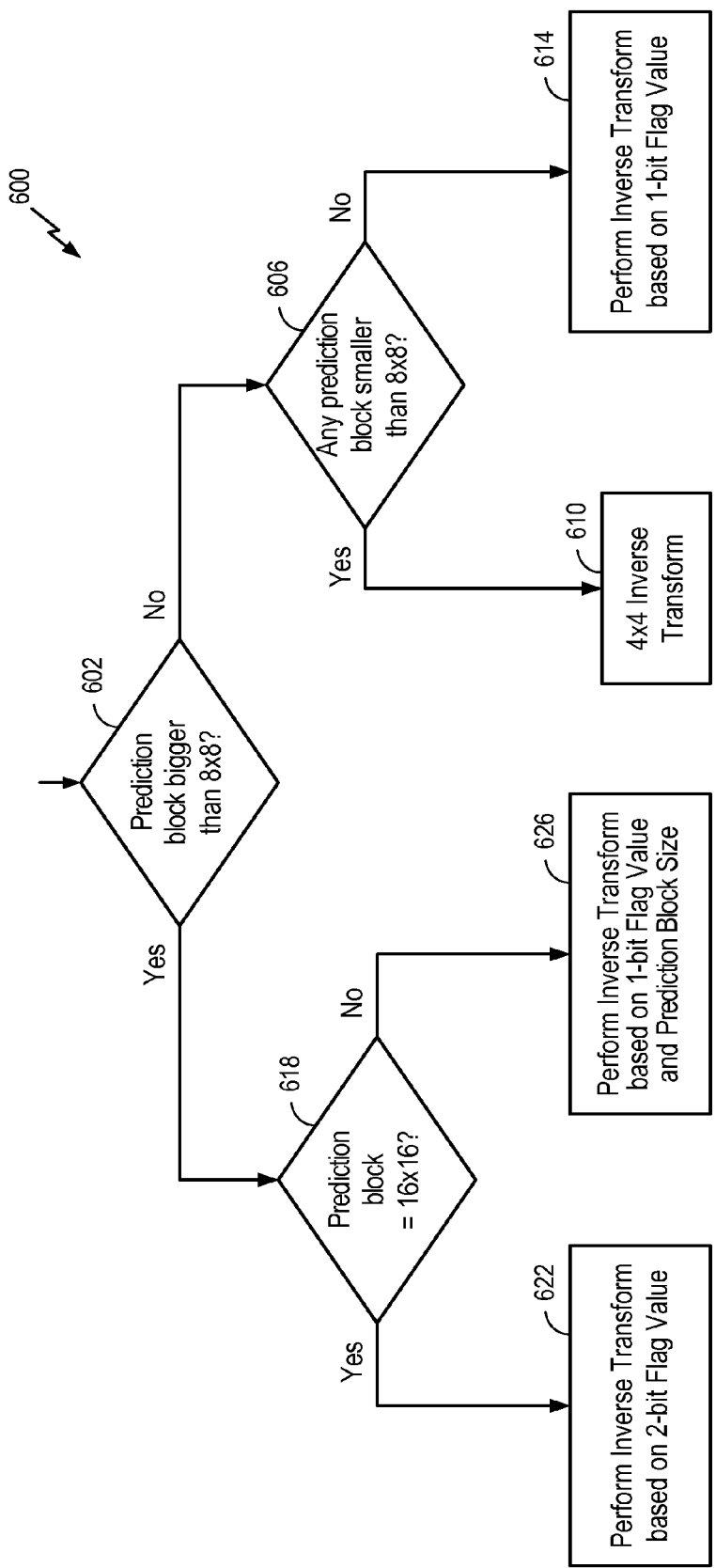
FIG. 6 is a flowchart of another embodiment of a process of selecting the correct inverse transform for decoding video data encoded according to the process of FIG. 4.

FIG. 6 is an exemplary embodiment of a process 600 for performing an inverse transform at a decoder 26 on a block encoded by an encoder 20 using process 400. Decoder 26, which may be a processor, is one means of performing the steps of process 600. At step 602 it is determined if the prediction block size is greater than 8×8. If the prediction block size is greater than 8×8, the process proceeds to a step 618 where it is determined if the prediction block size is 16×16. If the prediction block size is 16×16, process 600 continues to step 622 where the decoder looks for a 2-bit flag value and an inverse transform is performed on the block according to the flag value. The type of inverse transform to be used is shown in Table 2. Alternatively, if at step 618 it is determined the prediction block size is not 16×16, process 600 continues to step 626 where the decoder looks for a 1-bit flag value and an inverse transform is performed based on the 1-bit value and the motion partition size. The type of inverse transform to be used is shown in Table 2.

If at step 602 it is determined the prediction block size is not greater than 8×8, process 600 continues to step 606 where it is determined if the prediction block size is smaller than 8×8. If the prediction block size is smaller than 8×8, process 600 proceeds to a next step 610 where a 4×4 inverse transform is performed. If instead at step 606 it is determined the prediction block size is not smaller than 8×8, the process proceeds to a step 614 where the decoder looks for a 1-bit flag value and performs an inverse transform based on the flag value. The type of inverse transform to be used is shown in Table 2.

The processes 300, 400, 500, and 600 describe a particular syntax for determining the size of transform to use on a block of video. One of ordinary skill in the art will recognize that the processes are merely exemplary processes of encoding and decoding blocks and setting flag values. It should be noted that other processes with additional steps, fewer step, or with the steps rearranged may be used to achieve the same syntax as shown in either Table 1 or Table 2. Further, one of ordinary skill in the art will recognize that the particular flag value assigned to each transform indication may be changed. Additionally, syntaxes similar to those found in Table 1 and Table 2 may be formed.

It should also be noted that additional transform sizes (e.g., 32×32) and prediction block size (e.g., 32×32) may be used for encoding and decoding blocks and setting flag values. For example, while still using only 2-bits for the flag value as described above, the flag may indicate a size of transform of 32×32. For example, in process 300, step 362 could determine if the prediction block size equals 32×32, and step 370 could determine if the prediction block size equals 16×32. Steps 366, 374, and 378, could then be modified such that at each step, respectively, a 32×32, 16×32, or 32×16 transform is performed on the block. The flag value set at step 358, therefore, would indicate a transform of either 32×32, 16×32, or 32×16 as opposed to a transform of either 16×16, 8×16, or 16×8. Additional modifications may be made to indicate additional transform sizes using the combination of flag values and the prediction block size.

The bits of the flag-value are sent as part of the encoded video data along communications channel 16. Depending on the encoding scheme, the placement of the bits of the flag-value may differ along the bitstream sent. The flag value may be part of the header sent to the decoder. The header may contain additional header syntax elements which may identify particular characteristics of the current video block, such as a block type, a prediction mode, coded block pattern (CBP) for luma and chroma, a prediction block size, and one or more motion vectors. These header syntax elements may be generated, for example, at entropy coding unit 37, within video encoder 20.

In one embodiment the header includes a bit to indicate if there are nonzero coefficients in the encoded block. If nonzero coefficients exist then the bits indicating the transform size are also included in the header. If nonzero coefficients do not exist, then the transform size bits are not sent. In another embodiment, the transform size element is sent in each header regardless of whether nonzero coefficients exist.

The techniques described in this disclosure may be implemented in hardware, software, firmware, or any combination thereof. Any features described as units or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software units or hardware units configured for encoding and decoding, or incorporated in a combined video encoder-decoder (CODEC). Depiction of different features as units is intended to highlight different functional aspects of the devices illustrated and does not necessarily imply that such units must be realized by separate hardware or software components. Rather, functionality associated with one or more units may be integrated within common or separate hardware or software components.

Various embodiments of this disclosure have been described. These and other embodiments are within the scope of the following claims.

What is claimed is:

1. A method of encoding video data, the method comprising:
    applying spatial prediction or motion compensation to an original video block within a video frame to generate a prediction video block based on a prediction mode;
    subtracting the prediction video block from the original video block within the video frame to form a residual block;

selecting a transform having a first transform size to apply to the residual block;

applying the selected transform to the residual block to generate residual transform coefficients;

generating header data indicative of the selected transform, the header data comprising a first syntax element having a first value indicative of at least three transform sizes and a second syntax element indicative of a prediction block size of the prediction video block, wherein the at least three transform sizes comprise at least one N×M transform size and at least one of M and N is equal to or greater than 16, wherein the first value of the first syntax element only in combination with the second syntax element is indicative of the first transform size, wherein the header data further comprises a third syntax element to indicate if the residual transform coefficients include one or more nonzero coefficients; and generating a video signal based on the header data and the residual transform coefficients.

2. The method of claim 1, wherein the first syntax element sequentially follows after the third syntax element if the second value is non-zero.

3. The method of claim 1, wherein the first value of the first syntax element corresponds to a plurality of transform sizes.

4. The method of claim 3, wherein the first value maps to the first transform size based on the prediction block size of the prediction video block.

5. The method of claim 1, wherein the first transform size is of size X×Y, wherein X is not equal to Y.

6. The method of claim 5, wherein at least one of X and Y equals 8 and at least one of X and Y equals 16.

7. The method of claim 1, wherein the first transform size is equal to the prediction block size of the prediction video block.

8. The method of claim 1, wherein generating header data indicative of the selected transform comprises:
determining if the prediction block size is greater than a first threshold; and
determining if the prediction block size is less than a second threshold.

9. The method of claim 8, wherein the first threshold is 8×8, and the second threshold is 8×8.

10. The method of claim 1, wherein generating header data indicative of the selected transform comprises:
determining if the prediction block size is greater than a first threshold; and
determining if the prediction block size is equal to a second value.

11. The method of claim 10, wherein the first threshold is 8×8 and the second value is 16×16.

12. The method of claim 10, wherein the first threshold is 8×8 and the second value is 16×8.

13. The method of claim 1, wherein the selected transform is an integer transform.

14. The method of claim 1, wherein the selected transform is a discrete cosine transform.

15. The method of claim 1, wherein the selected transform is a directional transform.

16. A method of decoding video data, the method comprising:
receiving a video signal indicative of at least one block within a frame of video comprising header data for the at least one block and residual transform coefficients for the at least one block, the header data comprising a first syntax element having a first value indicative of at least three transform sizes and a second syntax element indicative of a prediction block size of the at least one block, wherein the at least three transform sizes comprise at least one N×M transform size and at least one of M and N is equal to or greater than 16, wherein the first value of the first syntax element only in combination with the second syntax element is indicative of the first transform size, wherein the header data further comprises a third syntax element to indicate if the residual transform coefficients include one or more nonzero coefficients;

applying spatial prediction or motion compensation to the at least one block to generate a prediction video block of the prediction block size of the at least one block;

determining the first transform size used to encode the at least one block based on the first syntax element and the second syntax element;

applying an inverse transform of the determined first transform size on the residual transform coefficients to obtain a decoded residual block; and adding the decoded residual block to the prediction video block to obtain a decoded video block.

17. The method of claim 16, wherein the first syntax element sequentially follows after the third syntax element if the second value is non-zero.

18. The method of claim 16, wherein the first value of the first syntax element corresponds to a plurality of transform sizes.

19. The method of claim 18, wherein the first value maps to the first transform size based on the prediction block size of the at least one block.

20. The method of claim 16, wherein the first transform size is of size X×Y, wherein X is not equal to Y.

21. The method of claim 20, wherein at least one of X and Y equals 8 and at least one of X and Y equals 16.

22. The method of claim 16, wherein the first transform size is equal to the prediction block size of the at least one block.

23. The method of claim 16, wherein determining the first transform size comprises:
determining if the prediction block size is greater than a first threshold; and
determining if the prediction block size is less than a second threshold.

24. The method of claim 23, wherein the first threshold is 8×8 and the second threshold is 8×8.

25. The method of claim 16, wherein determining the first transform size comprises:
determining if the prediction block size is greater than a first threshold; and
determining if the prediction block size is equal to a second value.

26. The method of claim 25, wherein the first threshold is 8×8, and the second value is 16×16.

27. The method of claim 25, wherein the first threshold is 8×8 and the second value is 16×8.

28. The method of claim 16, wherein the inverse transform is an integer transform.

29. The method of claim 16, wherein the inverse transform is a discrete cosine transform.

30. The method of claim 16, wherein the inverse transform is a directional transform.

31. An apparatus for encoding video data, the apparatus comprising:
means for applying spatial prediction or motion compensation to an original video block within a video frame to generate a prediction video block based on a prediction mode;

means for subtracting the prediction video block from the original video block within the video frame to form a residual block;
means for selecting a transform having a first transform size to apply to the residual block;
means for applying the selected transform to the residual block to generate residual transform coefficients;
means for generating header data indicative of the selected transform, the header data comprising a first syntax element having a first value indicative of at least three transform sizes and a second syntax element indicative of a prediction block size of the prediction video block, wherein the at least three transform sizes comprise at least one N×M transform size and at least one of M and N is equal to or greater than 16, wherein the first value of the first syntax element only in combination with the second syntax element is indicative of the first transform size, wherein the header data further comprises a third syntax element to indicate if the residual transform coefficients include one or more nonzero coefficients; and
means for generating a video signal based on the header data and the residual transform coefficients.

32. The apparatus of claim 31, wherein the means for applying spatial prediction or motion compensation comprises a prediction unit, the means for subtracting comprises a summer, the means for selecting the transform size comprises a mode decision unit, the means for generating header data comprises an entropy encoding unit, the means for applying the selected transform comprises a block transform unit, and the means for generating a video signal comprises the entropy encoding unit.

33. An apparatus for decoding video data, the apparatus comprising:
means for receiving a video signal indicative of at least one block within a frame of video comprising header data for the at least one block and residual transform coefficients for the at least one block, the header data comprising a first syntax element having a first value indicative of at least three transform sizes and a second syntax element indicative of a motion partition size of the at least one block, wherein the at least three transform sizes comprise at least one N×M transform size and at least one of M and N is equal to or greater than 16, wherein the first value of the first syntax element only in combination with the second syntax element is indicative of a transform having a first transform size used to encode the at least one block, wherein the header data further comprises a third syntax element to indicate if the residual transform coefficients include one or more nonzero coefficients;
means for applying spatial prediction or motion compensation to the at least one block to generate a prediction video block of the prediction block size of the at least one block;
means for determining the first transform size used to encode the at least one block based on the first syntax element and the second syntax element;
means for applying an inverse transform of the determined first transform size on the residual transform coefficients to obtain a decoded residual block; and
means for adding the decoded residual block to the prediction video block to obtain a decoded video block.

34. The apparatus of claim 33, wherein the means for receiving comprises a receiver, the means for applying spatial prediction or motion compensation comprises a prediction unit, the means for determining the first transform size comprises an entropy decoding unit, the means for applying inverse transform comprises an inverse transform unit, and the means for adding comprises a summer.

35. A system for encoding video data, the system comprising:
a memory configured to store a video frame; and
a processor configured to:
apply spatial prediction or motion compensation to an original video block within the video frame to generate a prediction video block;
subtract the prediction video block from the original video block within the video frame to form a residual block;
select a transform having a first transform size to apply to the residual block;
apply the selected transform to the residual block to generate residual transform coefficients; and
generate header data indicative of the selected transform, the header data comprising a first syntax element having a first value indicative of at least three transform sizes and a second syntax element indicative of a prediction block size of the prediction video block, wherein the at least three transform sizes comprise at least one N×M transform size and at least one of M and N is equal to or greater than 16, wherein the first value of the first syntax element only in combination with the second syntax element is indicative of the first transform size; and
generate a video signal based on the header data and the residual transform coefficients, wherein the header data further comprises a third syntax element to indicate if the residual transform coefficients include one or more nonzero coefficients.

36. The system of claim 35, wherein the first syntax element sequentially follows after the third syntax element if the second value is non-zero.

37. The system of claim 35, wherein the first value of the first syntax element corresponds to a plurality of transform sizes.

38. The system of claim 37, wherein the first value maps to the first transform size based on the prediction block size of the prediction video block.

39. The system of claim 35, wherein the first transform size is of size X×Y, wherein X is not equal to Y.

40. The system of claim 39, wherein at least one of X and Y equals 8 and at least one of X and Y equals 16.

41. The system of claim 35, wherein the first transform size is equal to the prediction block size of the prediction video block.

42. The system of claim 35, wherein the processor is further configured to determine if the prediction block size is greater than a first threshold and to determine if the prediction block size is less than a second threshold.

43. The system of claim 42, wherein the first threshold is 8×8, and the second threshold is 8×8.

44. The system of claim 35, wherein the processor is further configured to determine if the prediction block size is greater than a first threshold and to determine if the prediction block size is equal to a second value.

45. The system of claim 44, wherein the first threshold is 8×8 and the second value is 16×16.

46. The system of claim 44, wherein the first threshold is 8×8 and the second value is 16×8.

47. The system of claim 35, wherein the selected transform is an integer transform.

48. The system of claim 35, wherein the selected transform is a discrete cosine transform.

49. The system of claim 35, wherein the selected transform is a directional transform.

50. A system for decoding video data, the system comprising:
- a receiver configured to receive a video signal indicative of at least one block within a frame of video comprising header data for the at least one block and residual transform coefficients for the at least one block, the header data comprising a first syntax element having a first value indicative of at least three transform sizes and a second syntax element indicative of a prediction block size of the at least one block, wherein the at least three transform sizes comprise at least one N×M transform size and at least one of M and N is equal to or greater than 16, wherein the first value of the first syntax element only in combination with the second syntax element is indicative of a transform having a first transform size used to encode the at least one block, wherein the header data further comprises a third syntax element to indicate if the residual transform coefficients include one or more nonzero coefficients;
- a prediction unit configured to apply spatial prediction or motion compensation to the at least one block to generate a prediction video block of the prediction block size of the at least one block;
- an entropy decoding unit configured to determine the first transform size used to encode the at least one block based on the first syntax element and the second syntax element;
- an inverse transform unit configured to apply an inverse transform of the determined first transform size on the residual transform coefficients to obtain a decoded residual block; and
- a summer configured to add the decoded residual block to the prediction video block to obtain a decoded video block.

51. The system of claim 50, wherein the first syntax element sequentially follows after the third syntax element if the second value is non-zero.

52. The system of claim 50, wherein the first value of the first syntax element corresponds to a plurality of transform sizes.

53. The system of claim 52, wherein the first value maps to the first transform size based on the prediction block size of the at least one block.

54. The system of claim 50, wherein the first transform size is of size X×Y, wherein X is not equal to Y.

55. The system of claim 54, wherein at least one of X and Y equals 8 and at least one of X and Y equals 16.

56. The system of claim 50, wherein the first transform size is equal to the prediction block size of the at least one block.

57. The system of claim 50, wherein the entropy decoding unit is further configured to determine if the prediction block size is greater than a first threshold and to determine if the prediction block size is less than a second threshold.

58. The system of claim 57, wherein the first threshold is 8×8 and the second threshold is 8×8.

59. The system of claim 50, wherein the entropy decoding unit is further configured to determine if the prediction block size is greater than a first threshold and to determine if the prediction block size is equal to a second value.

60. The system of claim 59, wherein the first threshold is 8×8, and the second value is 16×16.

61. The system of claim 59, wherein the first threshold is 8×8 and the second value is 16×8.

62. The system of claim 50, wherein the inverse transform is an integer transform.

63. The system of claim 50, wherein the inverse transform is a discrete cosine transform.

64. The system of claim 50, wherein the inverse transform is a directional transform.

65. A non-transitory computer-readable storage medium, comprising instructions that when executed perform a method comprising:
- applying spatial prediction or motion compensation to an original video block within a video frame to generate a prediction video block based on a prediction mode;
- subtracting the prediction video block from the original video block within the video frame to form a residual block;
- selecting a transform having a first transform size to apply to the residual block;
- applying the selected transform to the residual block to generate residual transform coefficients;
- generating header data indicative of the selected transform, the header data comprising a first syntax element having a first value indicative of at least three transform sizes and a second syntax element indicative of a prediction block size of the prediction video block, wherein the at least three transform sizes comprise at least one N×M transform size and at least one of M and N is equal to or greater than 16, wherein the first value of the first syntax element only in combination with the second syntax element is indicative of the first transform size, wherein the header data further comprises a third syntax element to indicate if the residual transform coefficients include one or more nonzero coefficients;
and
- generating a video signal based on the header data and the residual transform coefficients.

66. A non-transitory computer-readable storage medium, comprising instructions that when executed perform a method comprising:
- receiving a video signal indicative of at least one block within a frame of video comprising header data for the at least one block and residual transform coefficients for the at least one block, the header data comprising a first syntax element having a first value indicative of at least three transform sizes and a second syntax element indicative of a prediction block size of the at least one block, wherein the at least three transform sizes comprise at least one N×M transform size and at least one of M and N is equal to or greater than 16, wherein the first value of the first syntax element only in combination with the second syntax element is indicative of a transform having a first transform size used to encode the at least one block, wherein the header data further comprises a third syntax element to indicate if the residual transform coefficients include one or more nonzero coefficients;
- applying spatial prediction or motion compensation to the at least one block to generate a prediction video block of the prediction block size of the at least one block;
- determining the first transform size used to encode the at least one block based on the first syntax element and the second syntax element;
- applying an inverse transform of the determined first transform size on the residual transform coefficients to obtain a decoded residual block; and
- adding the decoded residual block to the prediction video block to obtain a decoded video block.

67. The method of claim 1, wherein the first transform size is different than the prediction block size of the prediction video block.

68. The method of claim 1, wherein at least one of M and N is equal to or greater than 32.

69. The method of claim 16, wherein the first transform size is different than the prediction block size of the prediction video block.

70. The method of claim 16, wherein at least one of M and N is equal to or greater than 32.

71. The system of claim 35, wherein the first transform size is different than the prediction block size of the prediction video block.

72. The system of claim 35, wherein at least one of M and N is equal to or greater than 32.

73. The system of claim 50, wherein the first transform size is different than the prediction block size of the prediction video block.

74. The system of claim 50, wherein at least one of M and N is equal to or greater than 32.

* * * * *